US012643331B2

(12) United States Patent
Ferrari et al.

(10) Patent No.: US 12,643,331 B2
(45) Date of Patent: Jun. 2, 2026

(54) RECIRCULATION SYSTEM FOR INK OR OTHER MATERIAL IN A PRINTING APPARATUS, IN PARTICULAR INKJET, AND APPARATUS COMPRISING SAID RECIRCULATION SYSTEM

(71) Applicant: CEFLA SOCIETÀ COOPERATIVA, Imola (IT)

(72) Inventors: Luca Ferrari, Imola (IT); Francesco Ancarani, Imola (IT); Massimo Dovadola, Imola (IT)

( * ) Notice: Subject to any disclaimer, the term of this patent is extended or adjusted under 35 U.S.C. 154(b) by 186 days.

(21) Appl. No.: 18/771,913

(22) Filed: Jul. 12, 2024

(65) Prior Publication Data

US 2025/0018727 A1 Jan. 16, 2025

(30) Foreign Application Priority Data

Jul. 14, 2023 (IT) ........................ 102023000014844

(51) Int. Cl.
*B41J 2/18* (2006.01)
*B41J 2/175* (2006.01)

(52) U.S. Cl.
CPC ............. *B41J 2/18* (2013.01); *B41J 2/17513* (2013.01); *B41J 2/17556* (2013.01); *B41J 2/17596* (2013.01); *B41J 2202/08* (2013.01)

(58) Field of Classification Search
CPC ...... B41J 2/18; B41J 2/17513; B41J 2/17556; B41J 2/17596; B41J 2/175; B41J 29/377; B41J 2202/08; B29C 64/112; B29C 64/10
See application file for complete search history.

(56) References Cited

U.S. PATENT DOCUMENTS

| | | | | |
|---|---|---|---|---|
| 6,371,607 | B2 | 4/2002 | Gevaert | |
| 9,751,323 | B2 | 9/2017 | Miravet Jimenez et al. | |
| 2008/0210160 | A1 * | 9/2008 | Namekawa | B41J 2/175 95/266 |
| 2010/0177148 | A1 * | 7/2010 | Asami | B41J 2/18 347/85 |
| 2011/0279495 | A1 * | 11/2011 | Kuribayashi | B41J 2/17566 347/85 |
| 2012/0314009 | A1 | 12/2012 | Kasahara | |
| 2019/0084219 | A1 * | 3/2019 | Brusilovski | B41J 2/175 |
| 2020/0282739 | A1 | 9/2020 | Fernández Vázquez | |
| 2022/0314670 | A1 | 10/2022 | Torikai | |
| 2023/0173818 | A1 | 6/2023 | Dorvat | |

FOREIGN PATENT DOCUMENTS

| | | |
|---|---|---|
| EP | 2875956 | 5/2015 |

OTHER PUBLICATIONS

Ita;ian Patent and Trademark Office, Search Report, Jan. 12, 2024.

* cited by examiner

*Primary Examiner* — Jason S Uhlenhake
(74) *Attorney, Agent, or Firm* — Themis Law

(57) ABSTRACT

A recirculation system for ink or other material, fed to a printing head, in particular of inkjet type, includes at least one recirculation container associated with at least one printing head and translatable along a predefined printing stroke together with the printing head. The at least one recirculation container includes at least one containment chamber for the ink or other material and at least one thermal exchange chamber for the thermal energy from a heating fluid supplied by the heat exchange chamber with the ink or other material, the heat exchange chamber being in thermal contact with the at least one container.

10 Claims, 7 Drawing Sheets

RECIRCULATION SYSTEM FOR INK OR OTHER MATERIAL IN A PRINTING APPARATUS, IN PARTICULAR INKJET, AND APPARATUS COMPRISING SAID RECIRCULATION SYSTEM

FIELD OF THE INVENTION

The present invention relates to a system for recirculating ink, or the like, for printing equipment, in particular inkjet, and equipment comprising said recirculating system.

The present invention refers to the technical field of machines for printing on supports of various kinds, such as paper, cardboard, textile materials, metal materials, wood materials, plastic materials, minerals or the like.

BACKGROUND OF THE INVENTION

Equipment is known in the art, which comprises at least one tank for a printing material, such as paint, ink, or other types of enhancing materials. In particular, printing equipment is known, which has a plurality of tanks, each dedicated to a distinct color, varnish or enhancing material.

The printing material, taken from the tank, is delivered to a recirculation unit, which has the function of circulating the printing material through a printing head. In the prior art it is known that the recirculation of the printing material is necessary due to the tendency of the various printing materials to deposit and/or sediment, becoming unusable for printing and forcing a machine stop for cleaning operations and replenishment of new printing material.

Patent application EP2875956A1 by the same applicant describes a printing equipment comprising a printing head for printing a printing material on a support, and a recirculation unit. The recirculation unit comprises a first container, a second container, a first recirculation device for generating a first flow of said printing material from said first container towards said printing head and a second container, and a second recirculation device for transferring the printing material from the second container to the first container. In particular, the first container of the printing material is maintained at a first negative pressure, i.e. lower than atmospheric pressure, while the second container is maintained at a second negative pressure, i.e. lower than the pressure of the first container.

Patent application IT201600107827A1 also describes a printing equipment similar to that described in document EP2875956A1. In these documents, the heating of the ink provided in the recirculation chambers of the recirculation system takes place by means of thermal energy generation elements, particularly powered by electrical energy.

In currently known printing equipment, the recirculation system comprises thermal conditioning devices connected to at least one of the containers of the recirculation system to modify the physical characteristics, for instance temperature and viscosity, of the printing material circulating through the printing head. The thermal conditioning devices can comprise a temperature regulation system, for instance made with a heat transfer circuit, capable of modulating the temperature of the ink contained in at least one of the containers of the recirculation system itself, for instance by heating and/or cooling.

The heating element can comprise, for instance, an electric resistance as shown in a thermo-conditioning circuit, or other device suitable for the purpose.

Conditioning devices known in the state of the art can comprise, in combination with heating elements, also cooling elements to induce in at least one of the containers of the recirculation system a cooling of the printing material contained therein and adjust its temperature to that used by the printing head.

The temperature regulation system typically comprises a control unit, for instance a PLC which executes a control program of the ink thermal parameters state, which are measured by one or more sensors, and which control the operation of the thermal conditioning according to the achievement of the desired thermal conditions. This control unit comprises a plurality of electronic circuits typically assembled on electronic boards and the electronic components generate heat which must be dissipated, so that cooling systems are generally provided for the control unit or for the electronic components thereof.

The recirculation systems, and in a more general way the printing equipment comprising these systems are therefore relatively energy-intensive and above all in the context of the use of printing equipment for manufactured articles industrially manufactured (for instance painting of pieces, such as elements of furniture, covering elements and other products) energy consumption has become a very important parameter for the production cost and therefore for the cost of the finished product.

There is therefore an unsatisfied need to provide printing equipment, in particular of the industrial type, which can improve energy saving performance, for instance by avoiding the dissipation of energy into the environment.

At the state of the art, in fact, as described in the aforementioned documents, there are no solutions that are intended to optimize the energy consumption of printing equipment.

SUMMARY OF THE INVENTION

The present invention therefore has the purpose of realizing an ink recirculation system in printing equipment of the aforementioned type which allows overcoming the drawbacks present in the state of the art.

According to a first embodiment, the present invention solves the aforementioned problem, thanks to the provision of a system for recovering the heat generated by the electronic components of the control unit or part of said control unit and using this thermal energy for thermal conditioning, i.e. heating of the printing material, of the ink or the like, present in the recirculation system.

As will appear later on, this heat recovery system generated by the electronic units present in the printing equipment can be provided as the only heating system or it can be combined with the heating systems already known and provided in the state of the art and also to cooling systems already known and provided in the state of the art. In this case, especially in combination with traditional heating systems, the heating through the thermal energy recovered from the electronic components present in the printing equipment can operate in synergy with the traditional heating systems, for instance by carrying out a preliminary heating which raises the temperature of the ink with respect to that of the surrounding environment, whereby any further heating required to bring the ink to the working temperature of the printing head is performed by said conventional heating elements. In this case, the energy consumption necessary for these elements is less than what would be necessary in the absence of preventive heating by recovering thermal energy from the cooling processes of the printing equipment electronics.

In particular, the present invention solves the aforementioned problem with a recirculation system for ink, or the like, which has the combination of characteristics of the independent claim 1.

The recirculation system according to this claim comprises, in thermal contact with the ink containment compartment, at least one heat exchange chamber which is inserted in a circulation circuit of a heating fluid, said circuit comprising a further heat exchanger in thermal contact with one or more electronic circuit parts of the printing equipment, such as for instance one or more electronic boards and/or with one or more electronic components and/or with one or more thermal dissipators of said electronic components.

Said at least one heat exchange chamber comprises at least one inlet and at least one outlet for a flow of heating fluid, said inlet and said outlet being respectively connected to at least one outlet and to at least one inlet of said at least one heat exchanger of a cooling unit of one or more components of a control unit, which at least one heat exchanger is in thermal contact with one or more of said components, in particular one or more said electronic circuit components of the control unit and/or of the printing equipment.

According to a preferred embodiment, the recirculation system comprises at least two heat exchange chambers which are in thermal contact with at least one of the containers of the recycling system and between said heat exchange chambers said at least one container is interposed.

Again according to a preferred embodiment, the recirculation system comprises three or more heat exchange chambers which externally surround said at least one container of the recirculation system on three or more sides.

According to one embodiment, said heat exchange chambers can be separated from each other and connected at least for a part of them to a common heat exchanger in thermal contact with one or more parts of the electronics of the printing equipment or each of said chambers is connected to a dedicated heat exchanger in thermal contact with said one or more electronic parts of the printing equipment.

According to a variant embodiment, all or at least a part of the heat exchange chambers associated with said at least one container are mutually communicating, at least one inlet for the heating fluid being provided to said heat exchange chambers and at least one outlet from said heat exchange chambers.

In a preferred embodiment, the recirculation system comprises two containers which are provided side by side and optionally with a common intermediate separation wall, while a heat exchange chamber is provided for each container which is arranged along the external side wall of the respective container and is separated from the compartment of the corresponding container by said side wall of the same which is common to said container and to the heat exchange chamber.

In a further possible embodiment, a further third heat exchange chamber is provided in an intermediate position between them, in an area wherein the wall separating the two containers is divided into two independent branches.

One embodiment provides that at least one further heat exchange chamber is provided in the area of the bottom of said two containers at said separation wall common to the two containers divides into two mutually diverging branches and at the same time it forms the common separation wall from said further heat exchange chamber.

According to an advantageous embodiment, the two containers of the recirculation system and the associated heat exchange chambers with a heating fluid are made in a single body with continuous walls, i.e. a one-piece body, being envisaged for manufacturing an Additive Manufacturing process.

When an anti-sloshing element is provided, thanks to the additive manufacturing process it is possible to make together with the containers also further construction parts of the containers and/or of the heat exchange chambers, including, for instance and not limited to, the pipe unions for connection to the supply and outlet pipes of the heating fluid which can be shaped, directly and without further processing or without providing for the connection of separate parts, with the profiles provided for coupling to the connection terminals of said pipes, in particular to the connectors of so-called Luer couplings.

The advantages of the present invention appear evident from the previous description and will emerge more clearly from the following description of some embodiments illustrated in the attached drawings.

These advantages consist first of all in the fact of being able to recover a considerable amount of energy which would in any case have to be dissipated to avoid overheating of the electronic units present in the printing equipment.

Added to this advantage are the advantages relating to the specific embodiment relating to the energy recovery system, i.e. heating the ink or optionally preheating the ink or other printing material.

In fact, the structural configuration of the containers of the recirculation system and of the heat exchange chambers of the ink with the heating fluid offers optimal heat exchange conditions. This configuration can be obtained in a simple and relatively cheaper way using production processes of the Additive Manufacturing type which allow the creation of single-piece construction parts, i.e. in a single body wherein cavities of relatively complex shapes are provided and difficult to obtain with current production systems.

BRIEF DESCRIPTION OF THE DRAWINGS

The characteristics of the present invention indicated above as well as any further characteristics object of the dependent claims, as well as the advantages deriving from said characteristics are described in greater detail in relation to an embodiment illustrated in the attached figures wherein:

FIG. 1 shows a circuit diagram of a printing equipment which comprises an ink recirculation system of the type combinable with the features of the present invention.

DETAILED DESCRIPTION OF EMBODIMENTS OF THE INVENTION

Figure 1:
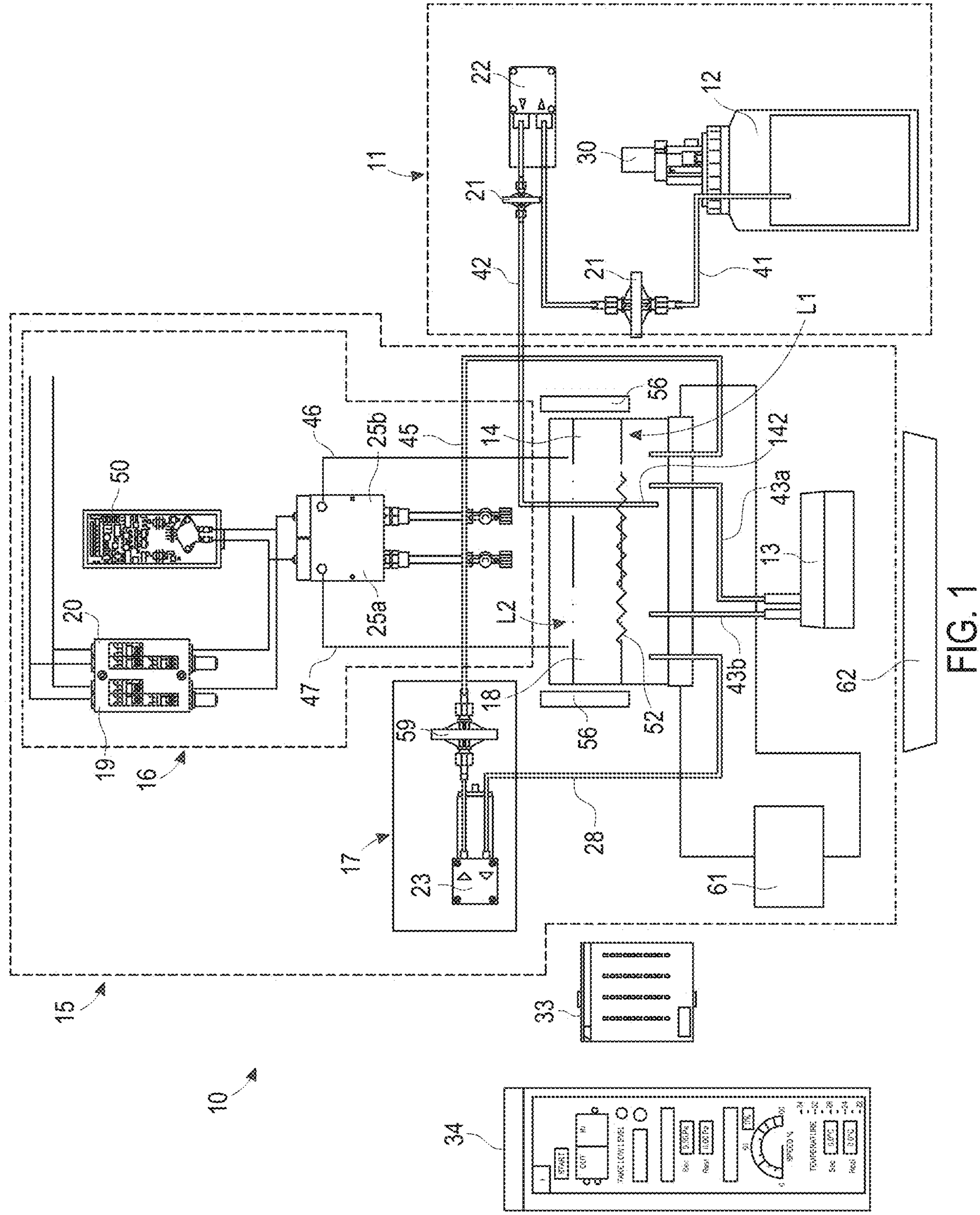
FIG. 1 shows a diagram of a supply and recirculation circuit for ink or other substances to be applied for printing, which has a recirculation system made according to the present invention.

Detailed descriptions of embodiments of the invention are provided herein. It is to be understood, however, that the present invention may be embodied in various forms. Therefore, the specific details disclosed herein are not to be interpreted as limiting, but rather as a representative basis for teaching one skilled in the art how to employ the present invention in virtually any detailed system, structure, or manner.

According to the embodiment shown, the printing equipment 10 comprises a feeding device 11 which has the purpose of feeding the printing material, i.e. the ink or a varnish or other type of printing material, towards a recirculation unit 15 which generates a continuous recirculation of the printing material in a printing head 13. The recirculation unit 15 for case of description is divided into two recirculation sub-units, a first sub-unit 16 and a second sub-unit 17.

The printing head 13 can be controlled in a known way to deposit the printing material, i.e. the ink, or the like, on the printing support (not shown in detail since it is not the subject of the present invention), according to a predetermined pattern.

According to a preferred embodiment, the feeding device 11 comprises an accumulation tank 12 wherein the printing material according to one or more of the variants defined above is contained, before being used for printing, and a first device for pumping unit 22 for transferring the printing material from the storage tank 12 to the recirculation unit 15. The tank 12 is connected to a filter device 21 via a pipe 41. The pumping device 22 draws the ink from the storage tank 12 through a first suction pipe 41, and coveys it to the recirculation unit 15 through a second pipe 42.

In one embodiment, the feeding device 11 can furthermore comprise a mixing device 30 for periodically or continuously mixing the printing material contained in the accumulation tank 12.

A filtering device 21 can be interposed on the first pipe 41 and/or on the second pipe 42, for instance in the form of a filter or other similar devices.

According to the exemplary but non-limiting embodiment illustrated in FIG. 1, the recirculation system 15 comprises a first container 14 for the ink which is connected to the supply device 11. The first container 14 is connected to the accumulation tank 12 through the pipe 42. The first container 14 is located upstream of a respective printing head 13 with which it is connected through a first pipe 43*a*. In a preferred embodiment, the first pipe 43*a* is connected to the lower area of the first container 14, so as to prevent the printing material contained in the first container 14 from incorporating air bubbles.

The recirculation system 15 further comprises a second container 18 for the printing material which comes from the printing head 13 via the pipe 43*b*. In a preferred embodiment, the second pipe 43*b* is connected to the lower portion of the second container 18, so as to prevent the printing material contained in the second container 18 from incorporating air bubbles.

In one embodiment, the first container 14 and the second container 18 for the printing material lie on the same plane and can contain two distinct levels of printing material.

The recirculation system 15 of the exemplary embodiment illustrated is of the pneumatic type and comprises a pair of elements 19, 20 for the generation of negative pressure (in the form of a series of solenoid valves) connected to the first container 14 and to the second container 18 of the printing material. In particular, the elements 19, 20 for generating negative pressure are configured to induce a negative pressure, or vacuum, inside the first container 14 and the second container 18. The elements 19 and 20 operate in such a way as to generate a difference of negative pressure which is established between the first container 14 and the second container 18 and which induces the movement of the printing material from the first container 14 to the second container 18, passing through the printing head 13.

In one embodiment, the elements 19, 20 for generating negative pressure consist of a series of solenoid valves which are assembled on a mechanical block made to exploit the Venturi principle. In particular, the element 19 gives the negative pressure to the first container 14 and the element 20 gives the negative pressure to the second container 18; the two negative pressures are different between the two containers 14 and 18 of the printing material.

Typically, the negative pressure value inside the first container 14 for the printing material is equal to −4 kilopascals, while the value inside the second container 18 for the printing material is equal to −10 kilopascals. This pressure difference triggers the passage of the printing material from the first container 14 to the second container 18 passing through the printing head 13.

By acting on the two negative pressure generation elements 19 and 20, it is possible to vary the negative pressure inside the containers 14 and 18 of the printing material. Indicatively, the negative pressure values that can be achieved vary between 0 and −50 kilopascals.

Different printing heads and different printing materials require setting up the negative pressures in the first 14 and second 18 printing material container.

The negative pressure values are detected by a pressure sensor 50 which detects the negative pressure values in the containers 14 and 18 of the printing material. The detected values are then sent to a control unit 33 which drives the elements 19 and 20 so as to obtain the desired negative pressure values.

Furthermore, the elements 19 and 20 have a further valve (not shown) which allows the cleaning of the printing head 13 with positive pressure, by modifying the pressure inside the containers 14 and 18 of the printing material. Obviously, the cleaning cycle, which involves feeding the printing head 13 with positive pressure, is performed when the machine is not printing.

According to one embodiment, there are two overflow tanks 25*a*, 25*b* which are interposed between the first container 14 and the second container 18 of the printing material, for instance in an intermediate position along a first connecting pipe 46 and a second connecting pipe 47.

In particular, it is envisaged that in the tank 25*a*, connected to the first container 14, the air is placed in a negative pressure condition, and also in the tank 25*b*, connected to the second container 18, a negative pressure condition is generated.

The tanks 25*a*, 25*b* can be provided with discharge valves, not shown in the drawings, of the condensate that may be generated, or of any printing material that may be present inside them. Furthermore, the tanks 25*a*, 25*b* can be provided with sensors for detecting the printing material which, if activated, control or supply a signal for deactivating the elements 19, 20 for generating negative pressure. In this way it is possible to avoid damage to the negative pressure generation elements 19, 20.

In an embodiment of the present invention, the recirculation unit 15 also comprises a second recirculation sub-unit 17 for transferring the printing material from the second container 18 to the first container 14.

The second recirculation sub-unit 17 comprises a pumping device 23 connected, via a pipe 28, to the first container 14 and to the second container 18, to transfer the printing material from the second container 18 to the first container 14.

In a preferred embodiment, the suction pipe 28 is connected with one of its first ends to the lower portion of the second container 18. This embodiment prevents air from being sucked in through the suction pipe 28.

The pipe 28 connects the pumping device 23 to the second container 18 of the printing material, while a pipe 45 connects the pumping device 23 to the first tank 14 of the printing material. In a preferred embodiment, the pipe 45 is connected with one of its first ends to the lower portion of the first container 14. This embodiment prevents air from being sucked in through the pipe 45.

In one embodiment, at least the delivery pipe 45 is provided with a filtering device 59 intended to filter the flow of printing material which is introduced from the second container 18 into the first container 14. Furthermore, the presence of the filtering device 59, in case of breakage of the membrane of the pumping device 23, prevents unwanted particles from ending up in the first container 14 of the printing material, and from there in the printing head 13 damaging it.

In one embodiment, detection devices 56 are provided which comprise a first level sensor for detecting the ink level in the first container 14, and a second level sensor for detecting the ink level in the second container 18.

The first level sensor and the second level sensor can be selected from a group comprising optical sensors, magnetic sensors, inductive sensors, capacitive sensors, floating elements, or possible combinations thereof.

In one embodiment, the recirculation system 15 comprises conditioning devices connected to at least one of the first 14 and second 18 containers to modify the physical characteristics, for instance temperature and viscosity, of the printing material circulating through the printing head 13.

The conditioning devices can comprise a temperature regulation system, for instance made with a heat transfer circuit, capable of modulating the temperature of the ink contained in at least one of the first 14 and second 18 containers, for instance by heating and/or cooling action.

The conditioning devices comprise for instance a heating element 52 assembled externally to the first 14 and second 18 containers of the printing material to heat the printing material contained in the latter according to predetermined methods.

Figure 2:
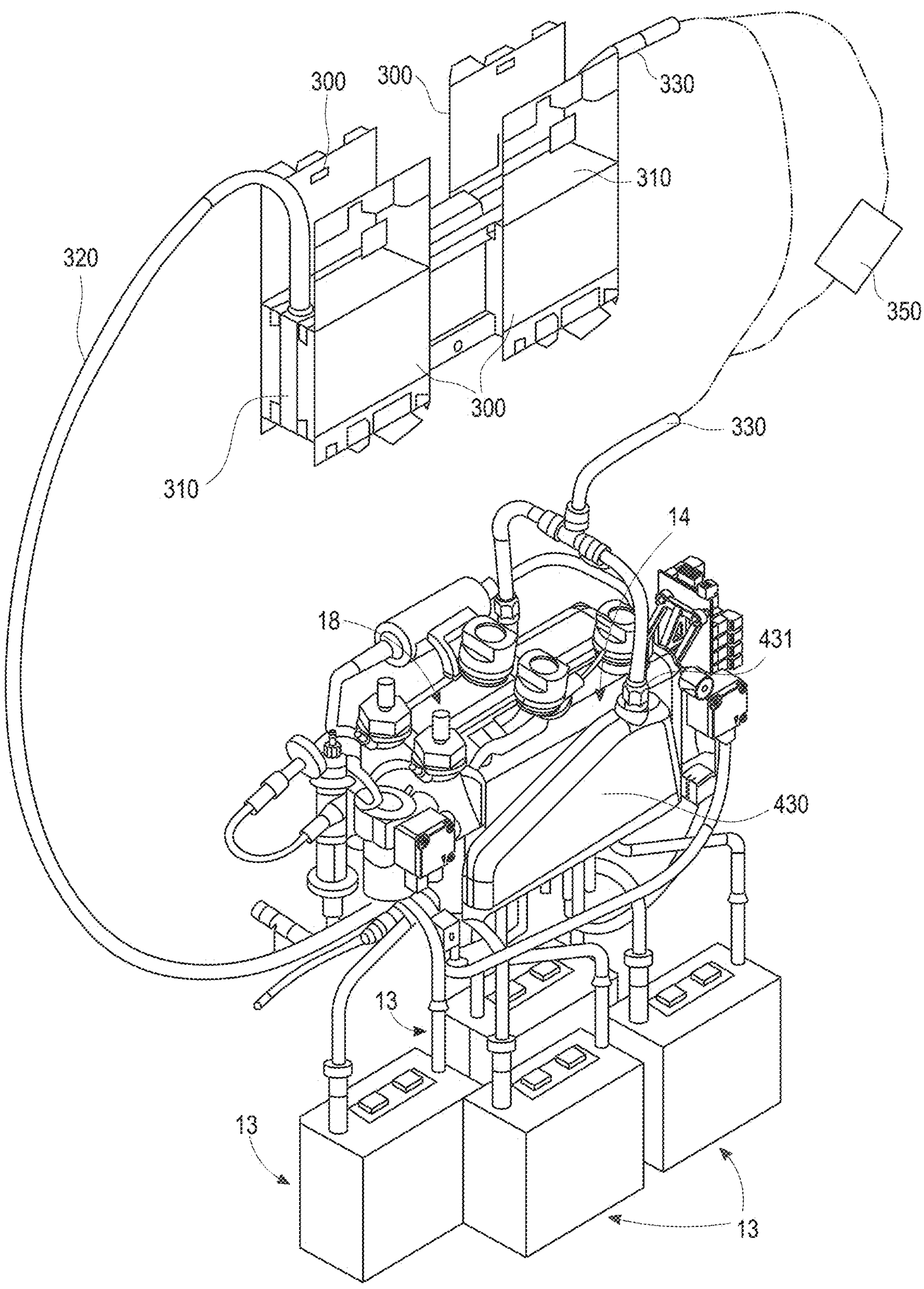
FIG. 2 shows in perspective and with several constructional parts not inherent in the invention having been omitted, the combination of a printing head with a recirculation system according to the present invention.

As shown in FIG. 2 and in the following FIGS. 3 to 5, the heating element can be constituted by a heating circuit which supplies a heating fluid to one or more heat exchange chambers 430, 440 with the ink present in the containers 14, 18 of the recirculation system 15. The heating fluid is charged with thermal energy by means of one or more heat exchangers 310 from which it is fed to one or more heat exchange chambers 430, 440, associated with the containers 14, 18 by means of one or more supply ducts 320. Furthermore, the heat exchange chambers 430, 440 are provided with at least one outlet from which the heating liquid which has passed through them, transferring heat to the ink present in the containers 14, 18 returns to said exchangers 310.

Several possible configurations of this heating system are envisaged, which will be described in greater detail below.

According to a possible embodiment and as shown in the diagram of FIG. 1, in combination with the heating circuit using the heat recovered from the cooling process of the electronic devices of the printing equipment, it is possible to provide additional heating elements which can be any type, for instance, but not limited to, an electric resistance as shown in FIG. 1, a thermo-conditioning circuit, or other device suitable for the purpose.

In a further embodiment variant, the conditioning devices comprise, in combination with one or more of said heating elements, also a cooling element 61 to induce in at least one of the first 14 and the second 18 containers a cooling of the printing material contained therein and adjust its temperature to that used by the printing head 13.

An example of a cooling element 61 can comprise a fluid-dynamic conditioning circuit which exploits the principles of a refrigeration cycle.

The ink heating circuit which operates by heating said ink by means of the thermal energy taken from the electronics of the printing equipment during the cooling process of said electronics can operate alternatively or in synergy with further heating and/or cooling devices.

In particular, a synergistic function is possible wherein a preheating phase of the ink is carried out with the thermal energy taken from the electronic circuits when they cool down, for instance at a temperature between room temperature and the optimal working temperature, while the ink is further heated with one or more further heating elements to pass from said intermediate temperature to the working temperature.

Due to this, the energy consumption due to the cooling of the electronic circuits is partially compensated by using the thermal energy dissipated for the pre-heating of the ink, while the energy consumption for the heating with the additional traditional heating elements and in any case limited due to the fact that the ink has been preheated from room temperature or from a starting temperature it would have had in the absence of the preheating action.

The printing equipment comprises a control unit 33, in particular a PLC, to monitor and manage at least the operating modes of the first recirculation subunit 16 and of the second recirculation subunit 17. In particular, the control unit 33, also as a function of the signals detected by the first level sensor and by the second level sensor, is capable of suitably managing the activation of the first pumping device 22 and of the pumping device 23 to maintain in the first container 14 and in the second container 18 a predetermined level of printing material in order to guarantee the correct supply of the printing head 13.

Figure 3:
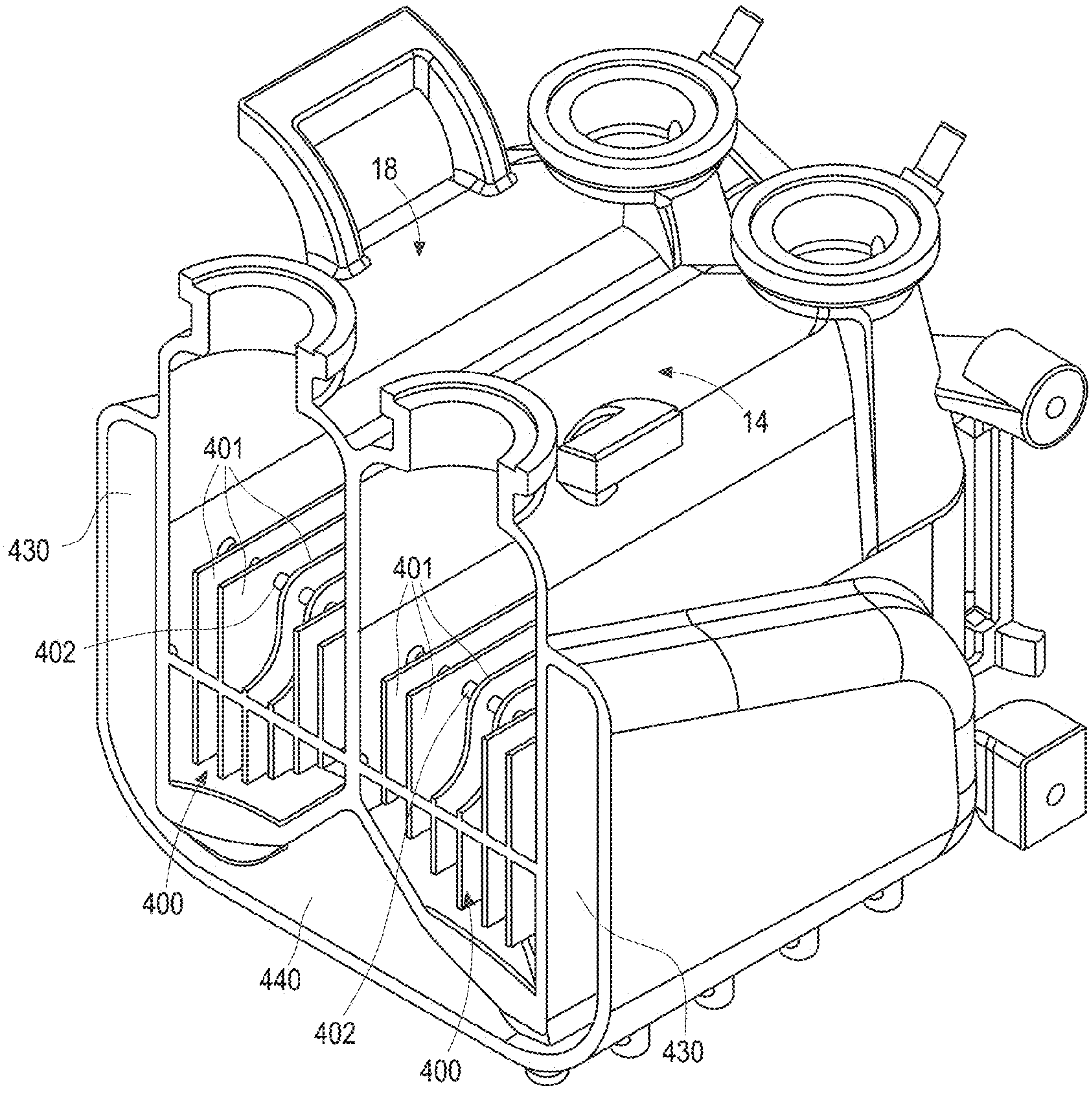
FIG. 3 shows a cross section along a vertical plane transversal to the two containers, of a combination of a first and a second container of a recirculation system according to a first embodiment of the present invention.

In one embodiment, the control unit 33 is connected with the components of the equipment 10 to be controlled and managed through electrical connections, such as electrical cables or electrical tracks (not shown), in case the control device comprises integrated boards, or PCB 300 (see for instance FIG. 3).

According to a further embodiment, the control unit 33 can be made dependent on interface devices 34 with a human user to allow the latter to selectively set some parameters relating to the recirculation of the printing material and monitor alarms and anomalies.

According to a variant embodiment, the interface devices 34 can be external to the printing equipment 10, for instance made using an electronic computer, such as a PC, or similar device.

Even if the present invention has been described with reference to a printing equipment 10 comprising a single printing head 13, it is evident that the same recirculation device can be applied to a printing equipment comprising several printing heads 13 as shown in FIG. 3.

In an embodiment, as shown in FIG. 2, the recirculation system 15 is also capable of feeding a greater number of printing heads, typically up to four.

However, executive variants are also possible wherein for each printing head 13 its own recirculation system 15 is provided similarly to what has been described above.

Typically, in printing equipment of the aforementioned type, the printing heads 13 and also at least part of the corresponding recirculation system 15, in particular the first and second containers 14, 18 are assembled on a slide or a trolley and are translatable along a guide, forwards and backwards, between two extreme positions. In this way the printing head or heads 13 can cover relatively large dimensions of print media. Generally, the translating direction is perpendicular to the advancing direction of the substrate.

FIG. 2 shows an embodiment wherein the two containers 14 and 18 of the recirculation system 15 feed four printing heads 13. Furthermore, the two containers 14 and 15 are integrated in a single one-piece body.

FIG. 2 also shows an exemplary embodiment of the control unit 33 or at least part of it comprising hardware sections of subsections, which components are distributed on various electronic boards, commonly referred to as PCBs which are generally indicated with 300.

According to one embodiment, the boards 300 are provided in combination with a system for cooling them consisting of one or more heat exchangers 310 which are in thermal contact with the boards themselves and which transfer the thermal energy from the boards to a heating or preheating fluid which is fed through ducts 320 to heat exchange chambers 430, 440 which are in thermal contact with the containers 14, 18.

Preferably, the supply circuit of the heating fluid to the heat exchange compartments 430, 440 associated with the containers 14 and 18 is of the type capable of allowing said heating fluid to recirculate between said heat exchange compartments 430, 440 and the exchangers 310. The heat exchange compartments 430, 440 can consist of a single chamber which surrounds at least part of the outer wall of the containers 14 and 18, or they can be compartments completely separated from each other or communicating through communication passages.

Furthermore, some heat exchange compartments can be further connected to a cooling fluid supply circuit.

According to a variant embodiment, the supply circuit of the heating fluid to the heat exchange chambers 430, 440 has a return branch 330 from the heat exchange chambers 430, 440 to the heat exchangers 310 with the electronic boards 300. This is straight as indicated in 330.

An alternative embodiment can provide that the return 330 feeds the heating fluid to a further heating system 350 which can be of any type, such as for instance a heat pump heating system or another type.

The system 350 can be provided in series or even in parallel with the heat exchangers 310.

Furthermore, although not illustrated in detail, the heating system referred to in the variants of FIG. 3 can also be provided in combination with heaters which directly exchange heat with one or both containers and which can operate in parallel with the recovery system of the heat dissipated by the electronic boards as described above.

Furthermore, it is possible to provide said additional heating system alternatively or also on the delivery 320 of the heating fluid from the heat exchangers 310 with the boards 300 to the heat exchange chambers 430, 440 of the containers 14, 18 of the recirculation system 15.

The containers 14 and 18 of the recirculation system 15 follow this reciprocating movement and the ink contained therein is subject to sudden decelerations and accelerations which involve a sloshing of the ink in said containers, with the consequent swaying of the surface of the mass of ink and with potential dangers of degeneration of the ink due to possible air inclusions and/or even mechanical effects on the material mixtures that make up the inks themselves.

Figure 4:
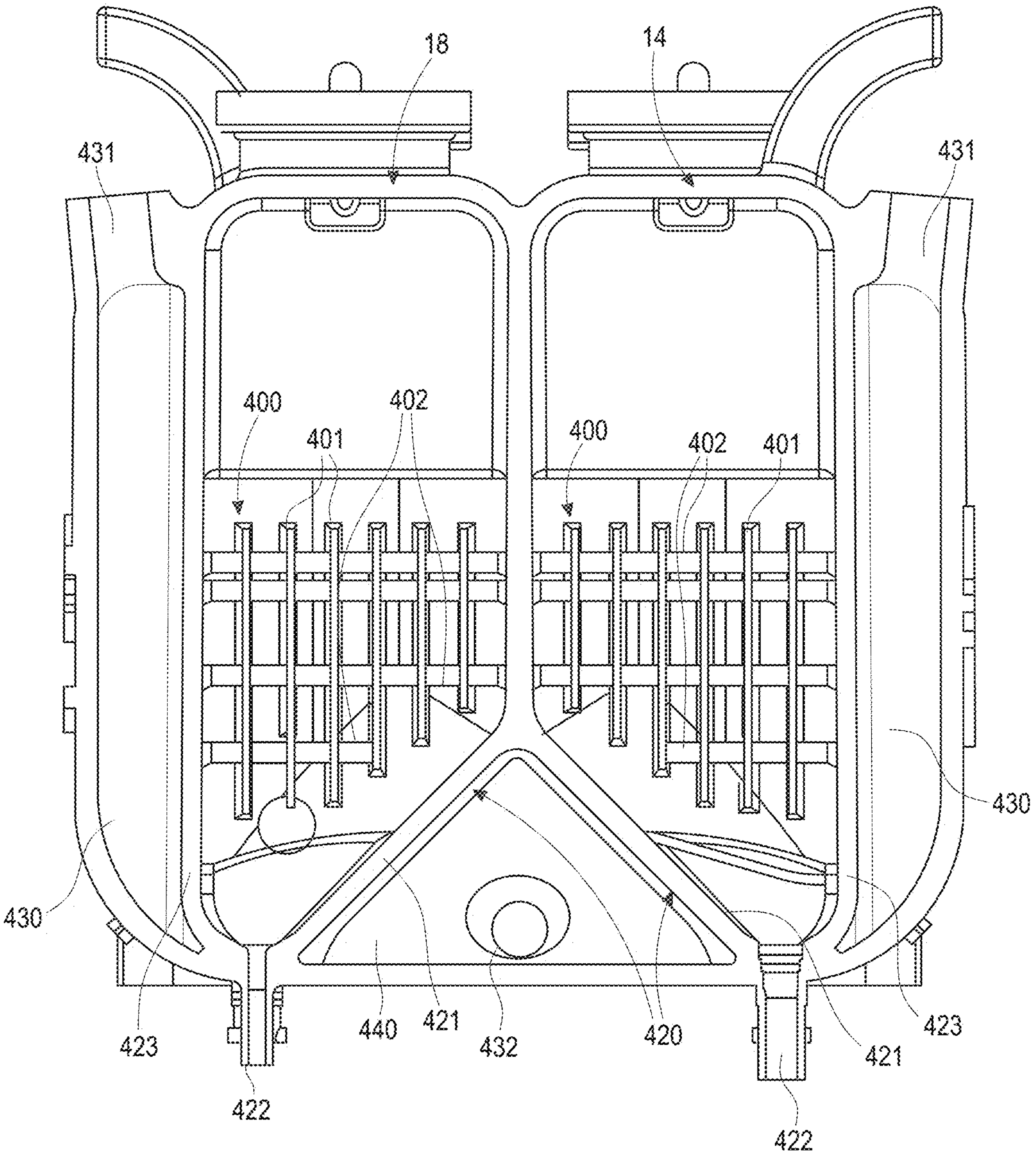
FIG. 4 shows an elevation view and in the direction of an axis perpendicular to the cross-sectional plane according to FIG. 3, said plane coinciding with the axes of the discharge holes of the two containers.

According to the present invention and as shown in FIGS. 3 and 4, the two containers 14 and 18 of the recirculation system 15 are made in one piece and of the same material. Said single body therefore makes it possible to overcome the problems of deterioration in the seal of the containers.

The production technique known as Additive Manufacturing has proved to be advantageous for this production.

Thanks to this technology, as shown in FIGS. 3 and 4, it has not only been possible to make the pair of containers 14 and 18 in a single piece body, but it has also been possible to integrate in the compartment of said containers 14 and 18 an anti-sloshing element which prevents these wavelike movements of the ink during the movement of the containers 14 and 18 together with the printing head or heads 13.

The anti-sloshing elements indicated with 400 in FIGS. 3 and 4 can be made according to different configurations and generally comprise structural elements, such as walls, rods, fins, ribs or other which constitute obstacles to the free flow of the ink from one to the opposite wall of the containers due to the inertia of the fluid motion and the reciprocating movement of the containers themselves.

Different embodiments of the anti-sloshing elements 400 are possible.

In particular, and without this constituting a limitation, but only by way of example, the containers according to the present example are intended to perform reciprocating translational movements in the transversal direction to the side walls of the same, or in a parallel or substantially parallel direction, relating to the sectional plane of FIGS. 3 and 4.

The illustrated non-limiting embodiment provides that said anti-sloshing elements consist of a plurality of bulkheads 401 which extend mainly transversely to the translating direction of the containers 14, 18.

According to the illustrated embodiment, the bulkheads can be parallel to each other and laterally equidistant, the distance being mainly defined by the number of bulkheads 401 provided.

The bulkheads 401 are held in position between crosspieces 402 in the form of rods transverse to the surface extension of the bulkheads themselves.

Advantageously and preferably, the compartments 403 into which the chamber or part of the chamber of the containers 14, 18 is divided communicate with each other.

Communication between compartments can take place due to different configurations of the bulkheads which can also comprise through windows, from side to side, distributed along their surface extension.

In the illustrated embodiment, the compartments 403 formed by the bulkheads 401 are open at least along one of the perimetral edges of the bulkheads themselves, for instance at least along the lower and upper edges of the bulkheads 401.

According to one embodiment, the anti-sloshing elements 400 are provided only in some areas of the chambers of the containers 14, 18, in particular approximately in the lower half of said containers 14, 18.

In the illustrated embodiment, communication between the compartments 403 delimited by the bulkheads 401 takes place due to the fact that said bulkheads end with at least part of their peripheral edges at a certain distance from the wall of the container 14, 18, thus defining passages between compartment and compartment 403.

Again according to an embodiment, the bulkheads 401 are arranged substantially vertically and divide the chamber into compartments 403 interposed between the two opposite side walls of the containers, between which the crosspieces 402 extend.

A possible embodiment instead provides opposite fins which branch off from opposite walls delimiting the container and which end at a certain distance from each other in an intermediate region of the same, forming an intermediate slot. The fins have a predominantly horizontal directional component and are slightly sloping towards the bottom in the direction of the intermediate slot. Preferably the fins are perforated, or grid shaped.

As is evident from FIGS. 3 and 4, a further characteristic of the containers 14 and 18 of the recirculation system according to the present invention provides that the bottom of the containers 14 and 18 is made in the form of an extension 420 in the shape of a bowl or well which is configured as a funnel.

For at least one sector 421 of the converging jacket side walls of said funnel shape of the bowl or well 420, the slope of said jacket wall 421 is relatively steep, i.e. it has a preponderant directional component which is oriented parallel to the vertical direction or to the axis of a discharge opening 422.

The funnel shape of the bowl or well 420 according to a preferred, but non-limiting embodiment variant is asymmetrical, said discharge opening 422 being provided laterally offset in the direction of a side wall of the corresponding container 14, 18 and in detail, but not as a limitation, of the jacket wall of the corresponding outermost container 14, 18. In this way, at least one sector 423 of the jacket wall of the funnel-shaped bowl or well 420 has a substantially vertical direction without deviating substantially from the extension direction of the jacket wall of the container 14, 18, while at least the diametrically opposite sector 421, with reference to the discharge opening 422 is sloping with respect to the vertical direction towards the opposite sector 423.

With reference to a further characteristic, externally to at least a part of the boundary wall of the containers 14, 18 and preferably, but not as a limitation externally to at least a part or all of the outermost side of the jacket wall of said containers 14, 18, for each container 14, 18 a chamber 430 for containing and optionally also for flowing of a heating fluid is provided.

Said chamber 430, i.e. the walls delimiting it, are made in one piece, i.e. they form a single body, with the walls of the containers 14, 18.

Figure 5:
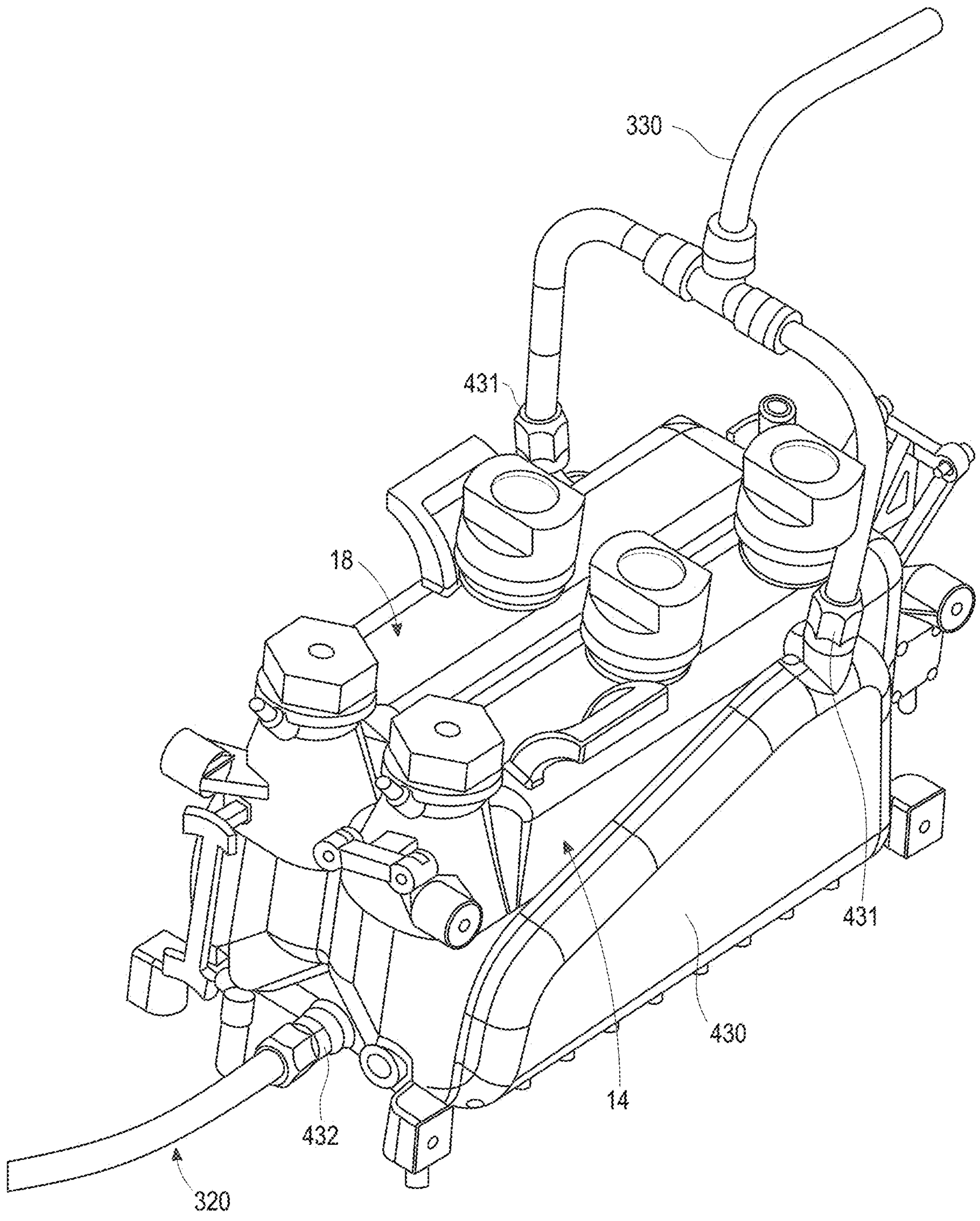
FIG. 5 shows a perspective view of the one-piece body comprising the containers and the heat exchange chambers relating to the recirculation system according to the present invention.

The cross-sectional plane of FIG. 5 shows the two heat exchange chambers 430 with a corresponding opening 431, for instance a heating fluid discharge opening, a further supply opening for said heating fluid being also provided which is visible in FIG. 4 and is indicated with 432.

According to yet another embodiment, visible in the figures, it is possible to provide additional heat exchange chambers, such as the one indicated with 440 and provided in a non-limiting way in an intermediate position between the two containers 14 and 15, and in particular between the two funnel-shaped bowl or well extensions on the bottom side of the same.

The additional heat exchange chamber can be used for the heat exchange of the containers, i.e. of the ink contained in them with a cooling fluid.

Alternatively, it is possible to modify the fluid supply circuit in such a way that only a heating fluid or a cooling fluid can be supplied to one or more of the heat exchange chambers or in such a way that depending on the conditioning functions at least some or all of the heat exchange chambers 430 and 440 are required to be alternatively supplied with a heating fluid or a cooling fluid.

Also this configuration of the heat exchange chambers is advantageously obtained thanks to a production process called Additive Manufacturing which allows to make all the walls of the containers and of the heat exchange chambers as well as the anti-sloshing devices as a one-piece body, i.e. as a single body.

With reference to FIG. 5, in a preferred embodiment, the pair of containers 14 and 18 of the recirculation system is in the form of a single body C as already indicated and described above, said body also comprising the walls delimiting the heat exchange chambers. According to this example, the two lateral heat exchange chambers 430 and the lower central one 440 communicate with each other, since the inlet of the heat exchange fluid, in particular for heating 432, is provided in the lower central chamber, while the heat exchange fluid, in heating element comes out of each of the two lateral, external heat exchange chambers 430 through a corresponding outlet 431.

With reference to FIG. 2, the heat exchange fluid comes from heat exchangers 310 which are in thermal contact with one or more circuit boards of the control unit 33 or part thereof and which are intended for the dissipation of the heat produced by these boards. The outlets 431 of the heat exchange chambers 430 connect back to the heat exchangers 310 with a common return pipe 330.

Thanks to this configuration, the heat taken from the boards for their cooling to the desired working temperature, or to preheat it to a temperature closer to the working one.

Figure 6:
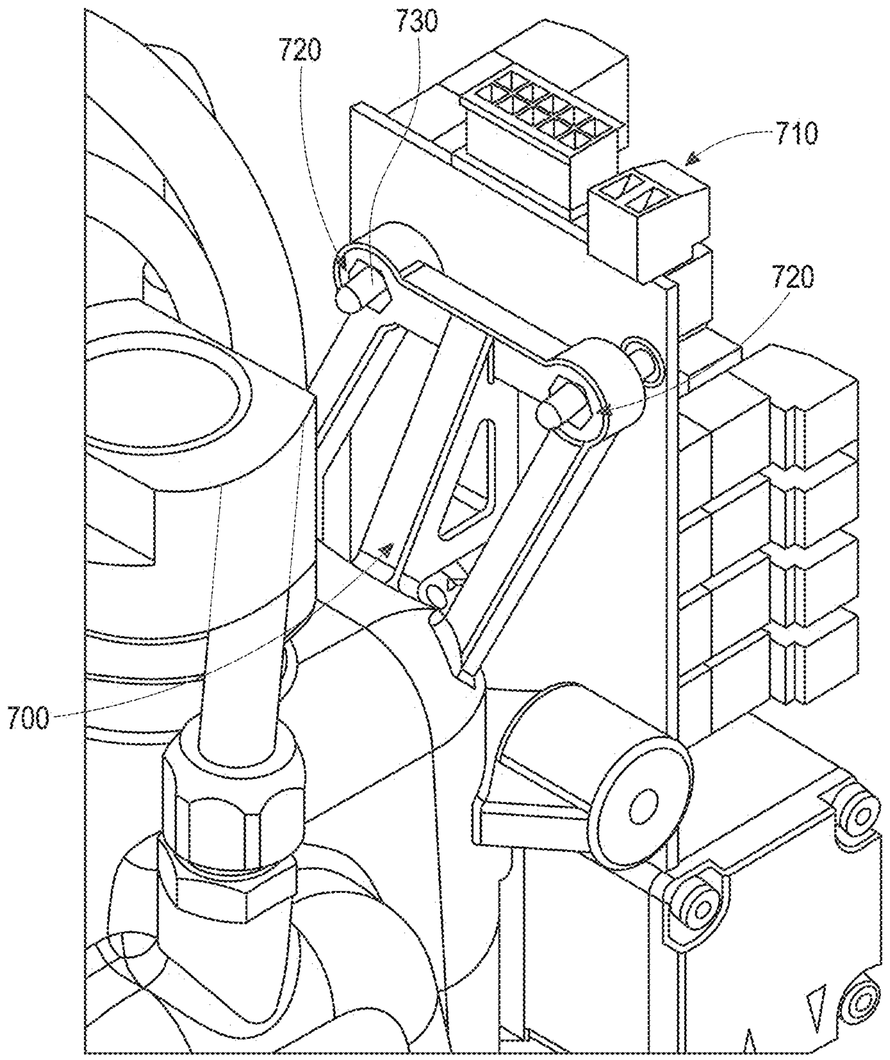
FIG. 6 illustrates a constructional detail of the container combination of the recirculation system according to the present invention.
Figure 7:
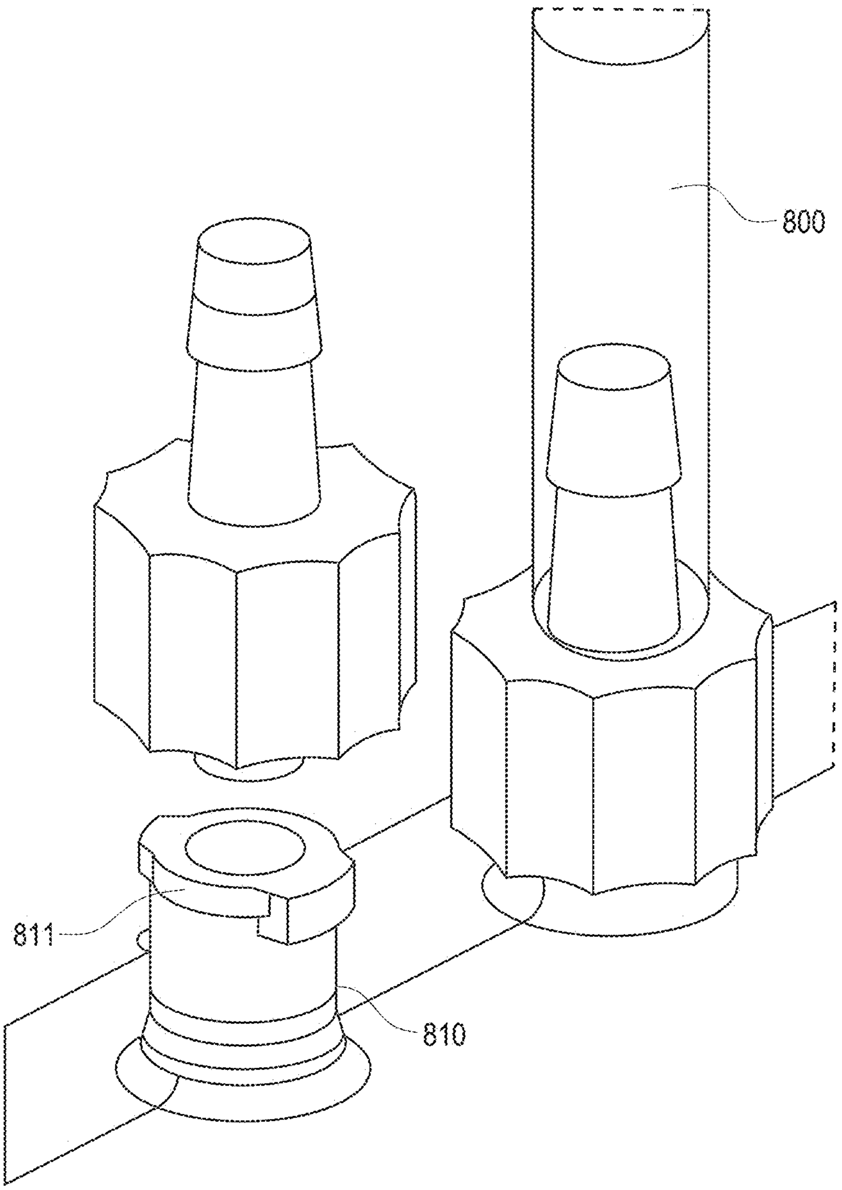
FIG. 7 illustrates yet another constructional detail of the container combination of the recirculation system according to the present invention.

FIGS. 6 and 7 illustrate further configurations of the containers 14, 18 of the recirculation system 15 which can be obtained easily and with limited costs since they do not require post-processing by means of chip removal forming processes thanks to the additive manufacturing process.

In particular, the containers 14 and 18 have at least one, generally a plurality of brackets 700 for fixing additional parts, such as the board 710 which can already be made with the specific shape required, without the need for post-processing, and which specifically also have housings 720 of a shape corresponding to the nut screws 730 for tightening the fastening bolts of the electronic board 710.

Similarly a further feature of the containers 14 and 18 according to the present invention and which can be made at low costs by avoiding post-processing with chip removal forming processes, provides that, for instance for fixing the more rigid PE pipes 800 coming from the ink inlet and recirculation pumps, the corresponding pipe unions 810 on the containers 14, 18 have been shaped so as to reproduce the male Luer profiles 811 directly on the pipe unions during the manufacture of the containers 14, 18. This entails a strengthening of the connection and avoids the breakage of the tail piece when fixing the tube.

While the invention has been described in connection with the above-described embodiments, it is not intended to limit the scope of the invention to the particular forms set forth, but on the contrary, it is intended to cover such alternatives, modifications, and equivalents as may be included within the scope of the invention. Further, the scope of the present invention fully encompasses other embodiments that may become obvious to those skilled in the art and the scope of the present invention is limited only by the appended claims.

LIST OF REFERENCE NUMBERS

10 printing equipment
11 feeding device
12 storage tank for the printing material
13 printing head
14 first container of the printing material
15 recirculation unit
16 first recirculation sub-unit
17 second recirculation sub-unit
18 second container of the printing material
19 element for generating negative pressure
20 element for generating negative pressure
21 filter device
22 pumping device
23 pumping device
25*a* first overflow tank
25*b* second overflow tank
28 pipe
30 mixing device
33 control unit
34 interface device
41 pipe
42 pipe
43*a* pipe
43*b* pipe
45 pipe
46 pipe
47 pipe
50 pressure sensor
52 heating element
56 detection devices
59 filter device
61 cooling element
300 control units electronic boards
310 heat exchanger
320, 330 ducts
350 additional heating system
400 anti-sloshing elements
401 bulkheads
402 stringer
403 chambers
420 funnel extension
421 jacket wall sector
422 discharge outlet
423 jacket wall sector
430 heat exchange chamber
431 heat exchange chamber outlets
423 feeding opening
440 heat exchange chamber
700 brackets
710 electronic board
720 housings
730 nut screw
800 PE rigid pipe
810 pipe union
811 Luer attachment profile

The invention claimed is:

1. A system of recirculation of a printing head for ink or other material fed to the printing head, the printing head being of inkjet type, the system of recirculation comprising:

at least one recirculation container with an outlet and an inlet connected respectively to an inlet and an outlet of printing head, the at least one recirculation container being translatable along a predefined printing stroke together with the printing head, wherein the at least one recirculation container comprises at least one containment chamber for the ink or other material and at least one thermal exchange chamber for thermal energy from a heating fluid supplied by the at least one thermal exchange chamber with the ink or other material, the at least one thermal exchange chamber being in thermal contact with the at least one recirculation container, wherein the system of recirculation and/or the printing head are provided in combination with a control unit of one or more control elements and/or one or more sensors comprising one or more electronic components mounted on one or more electronic boards, and wherein the at least one thermal exchange chamber coupled to the at least one recirculation container is connected to a delivery duct and a return duct to a heat exchanger for cooling the one or more electronic components mounted on the one or more electronic boards, the heat exchanger being in thermal contact with one or more of the one or more electronic boards, optionally also of those present in a printing apparatus comprising a combination of printing head and the system of recirculation.

2. The system according to claim 1, wherein a return of the heating fluid from the at least one thermal exchange chambers of the at least one recirculation container takes place directly or through an additional heating system provided in series or in parallel in the return and in heat exchange with the heating fluid.

3. The system according to claim 1, further comprising, in combination, additional heating elements of the ink or other material provided in the at least one recirculation container and/or additional cooling elements of the ink or other material provided in the at least one container.

4. The system according to claim 1, wherein a plurality of heat exchange chambers are provided in the at least one container, which are distributed along at least part of an outer wall of the at least one container and are connected to a same circulation circuit of the heating fluid comprising at least one heat exchanger with at least part of electronic circuits, or each or some of the heat exchange chambers is connected to one or more dedicated heat exchangers by way of a dedicated circuit for the heating fluid.

5. The system according to claim 1, wherein a plurality of heat exchange chambers are provided with the at least one container and are distributed along at least part of an outer wall of the at least one container, the plurality of heat exchange chambers being separate or communicating with each other.

6. The system according to claim 1, wherein the at least one container comprises:

a first recirculation container of the ink or other material connected to a supply circuit and further connected, upstream of the printing head, to the inlet of the printing head; and a second recirculation container of the ink or other material, connected, downstream of the printing head, to the outlet of the printing head, wherein the first recirculation container and/or the second recirculation container are each associated with a dedicated heat exchange chamber and/or with a common heat exchange chamber, the dedicated and/or common heat exchange chambers being in thermal contact respectively with one of the first or the second recirculation containers or simultaneously with both the first and the second recirculation container.

7. The system according to claim 6, wherein the first and the second recirculation container and the dedicated and/or common heat exchange chambers are in thermal contact with the first and the second recirculation container, which are made in a single body that includes one-piece and by using an Additive Manufacturing production technique.

8. The system according to claim 6, further comprising anti-sloshing devices of the ink or other material provided inside one or both of first and the second recirculation containers.

9. A printing apparatus for printing a printing support, comprising:

a printing head for ejecting onto the printing support an ink or other material; and a feeding circuit to the printing head of the printing ink or other material, wherein the feeding circuit comprises a tank for containing the ink or other material, the tank being connected to the printing head through a recirculation system to cause a recirculation of the ink or other material through the printing head, and wherein the recirculation system is configured according to claim 1.

10. The printing apparatus according to claim 9, further comprising an electronic control unit comprising one or more electronic boards, one or more elements of the electronic boards, and/or one or more electronic components present on the one or more electronic boards, and further comprising cooling elements comprise heat exchangers in thermal contact with the one or more electronic boards and/or with the one or more electronic components, the heat exchangers having an outlet connected to an entry passage to one or more heat exchange chambers associated to the at least one recirculation container of the recirculation system of the ink or other printing material, and an inlet connected to an exit passage from the one or more heat exchange chambers to circulate a heat exchange fluid between the heat exchangers in thermal contact with the one or more electronic boards or the one or more electronic components and the one or more heat exchange chambers with the ink or other material present in the at least one recirculation container of the recirculation system.

* * * * *